US006246739B1

(12) United States Patent
Khorana et al.

(10) Patent No.: US 6,246,739 B1
(45) Date of Patent: Jun. 12, 2001

(54) PASSIVE AEROSOL RETENTION APPARATUS

(75) Inventors: Shyam Satinder Khorana, San Jose; Jimmy Frank Galtman, Gilroy, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/291,518

(22) Filed: Apr. 14, 1999

(51) Int. Cl.[7] .............................. G21C 9/00; B01D 50/00; B01D 59/50

(52) U.S. Cl. .......................... 376/309; 376/313; 376/293; 55/318; 55/399

(58) Field of Search ..................... 55/421, 447; 376/283, 376/309, 313, 293, 389, 369, 370; 34/79; 165/111

(56) References Cited

U.S. PATENT DOCUMENTS 2,970,669 * 2/1961 Bergson .................................. 183/2
3,593,496 * 7/1971 Merrill ..................................... 55/77
3,813,854 * 6/1974 Hortman ................................ 55/399
4,567,941 * 2/1986 Coppolani et al. .................. 165/111
4,571,323 * 2/1986 Costes ................................. 376/282

* cited by examiner

*Primary Examiner*—Charles T. Jordan
*Assistant Examiner*—K. Kevin Mun
(74) *Attorney, Agent, or Firm*—Armstrong Teasdale LLP

(57) ABSTRACT

Passive aerosol retention apparatus positioned in the connecting vents of a nuclear reactor containment are described. The aerosol retention apparatus minimizes aerosol transport from the lower drywell to the upper drywell of the reactor containment. The retention apparatus includes a substantially cylindrical housing and a flow modulator positioned inside the housing and extending at least partially from a first end to a second end of the housing. The flow modulator includes a helically shaped baffle positioned in the housing so as to be coaxial with the housing. The baffle is coupled at each end to the housing by attachment bars.

18 Claims, 5 Drawing Sheets

PASSIVE AEROSOL RETENTION APPARATUS

BACKGROUND OF THE INVENTION

This invention relates generally to nuclear reactors, and more particularly, to a passive aerosol retention device for reducing the offsite radiation dose resulting from particulate aerosols during a severe accident.

One known boiling water nuclear reactor includes a reactor pressure vessel and a primary containment vessel. The primary containment vessel includes a lower, an upper drywell, and a passive containment cooling system. The upper drywell is separated from the lower drywell by the reactor pressure vessel skirt and support. Circular vents permit communication between the lower and upper drywells. The primary containment vessel surrounds the reactor pressure vessel and can withstand pressure generated by the reactor pressure vessel during reactor accident conditions and to contain any radioactive aerosols that may be generated during a severe accident condition. Particularly, the reactor pressure vessel is positioned within the primary containment vessel, which contains pressure resulting from accidents including a Loss-Of-Coolant Accident (LOCA), and severe accidents.

During a theoretical case of a severe accident, interactions of the corium with structural materials may cause the generation of radioactive aerosols, primarily in the lower drywell. These aerosols are subsequently transported into the upper drywell through the connecting vents by a steam and non-condensable gas flow. Recirculatory flows between the upper and lower drywell tend to distribute the aerosols between the upper and lower drywells. A certain percentage of the aerosols are retained in the upper drywell due to agglomeration and deposition on the containment surface. A portion of the aerosols are transported to the suppression pool via the passive containment cooling system. Some of the insoluble particulate aerosols deposit in the tubes and headers of the passive containment condenser (PCC) unit, thereby degrading the PCC heat removal capability and the overall containment heat removal performance.

Another portion of the aerosols in the upper drywell escape via leakage paths which may develop during a severe accident. The leakage of aerosols from the containment vessel is an important contributor to the offsite radiation dose. In addition, a resuspension of the aerosols agglomerated and deposited on the containment walls and in the PCC tubes and headers may occur which have an effect on the aerosol concentration in the upper drywell.

It would be desirable to provide a mechanism to minimize the offsite radiation dose and improve containment heat transfer capability during a severe accident by reducing the aerosol concentration in the upper drywell.

BRIEF SUMMARY OF THE INVENTION

Passive aerosol retention apparatus positioned in the connecting vents of a nuclear reactor are described. The aerosol retention apparatus minimizes aerosol transport from the lower drywell to the upper drywell of the reactor. The retention apparatus includes a substantially cylindrical housing and a flow modulator positioned inside the housing and extending at least partially from a first end to a second end of the housing. The flow modulator includes a helically shaped baffle positioned in the housing so as to be coaxial with the housing. The baffle is coupled at each end to the housing by attachment bars.

In one embodiment, the diameter of the helical baffle is less than the inside diameter of the housing. The angle formed by the intersection of the helical baffle and a radial plane extending perpendicular to a longitudinal plane, is about 30 to about 60 degrees. The longitudinal plane passes through the longitudinal axis of the housing.

The aerosol retention apparatus is positioned in the connecting vents that are located between the lower and upper drywell. In operation, the helical baffle of the aerosol retention apparatus imparts a rotational component to the steam, gas and aerosol mixture as the mixture flows from the lower drywell to the upper drywell. The resulting tangential acceleration imparted to the aerosol particles causes the aerosol particles to be thrown against the inside surface of the housing of the apparatus. The insoluble aerosol particles then may adhere to the inside surface of the housing or drop back into the lower drywell. The aerosol particles that impact the housing, agglomerate and build-up on the inside surface of the housing and then flow back into the lower drywell because only a thin layer of aerosol particles can be maintained on the vertical inside surface of the housing.

DETAILED DESCRIPTION OF THE INVENTION

Figure 1:
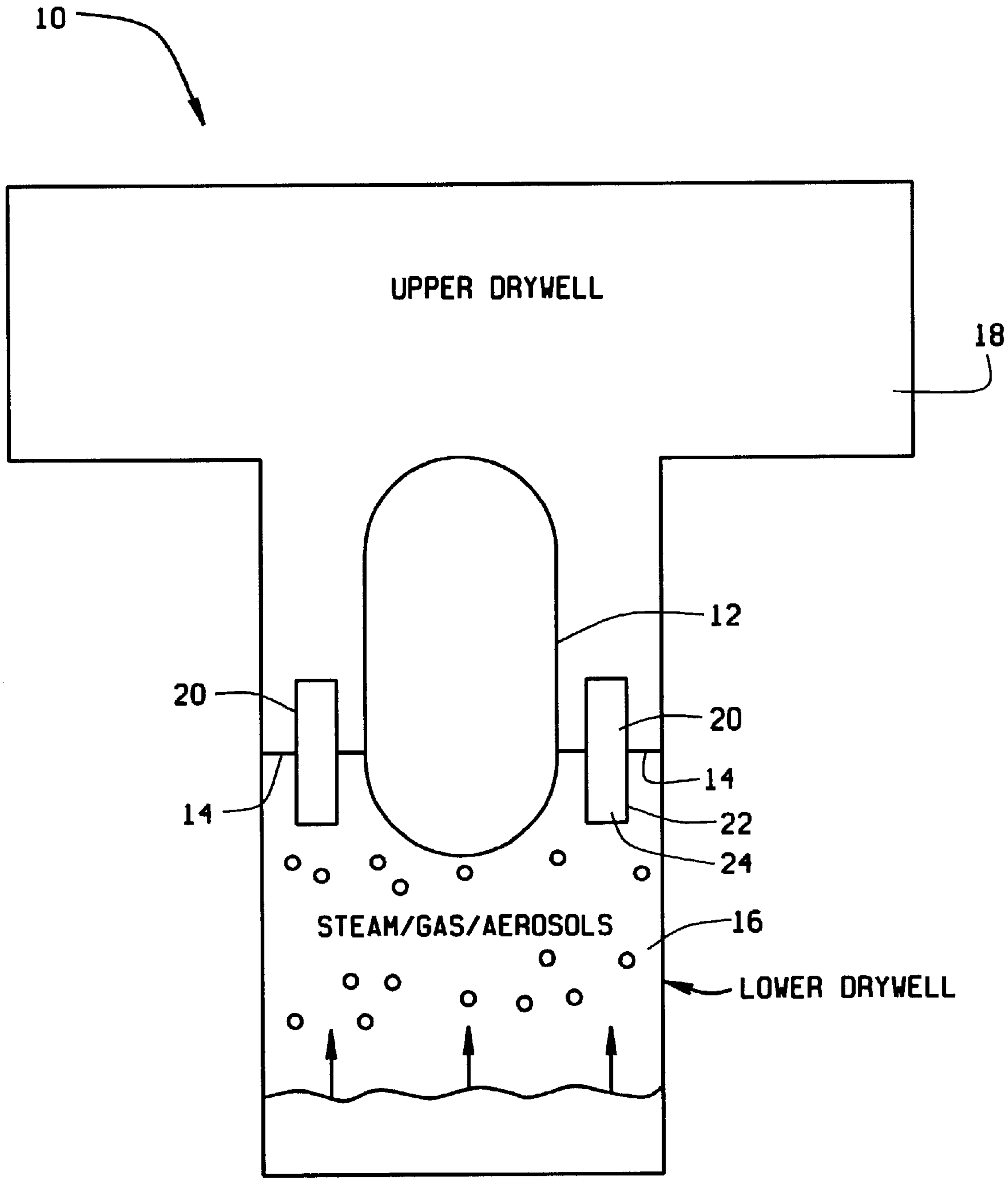
FIG. 1 is a schematic side view of a nuclear reactor showing a reactor pressure vessel located in a primary containment vessel.

FIG. 1 is a schematic side view of a nuclear reactor 10 which includes a reactor pressure vessel 12 supported by a reactor support 14. Pressure vessel 12 and reactor support 14 separate a lower drywell 16 from an upper drywell 18. A plurality of connecting vents 20 (two shown in FIG. 1) extend through reactor support 14 and are located circumferentially around reactor support 14. Each connecting vent 20 includes an outer wall 22 which defines a bore 24 extending through connecting vent 20. Connecting vent bore 24 provides for flow communication between lower drywell 16 and upper drywell 18.

During a theoretical severe accident condition, for example, a melt down outside reactor pressure vessel 12, radioactive aerosols may be formed, primarily in lower drywell 16. These radioactive aerosols are transported to upper drywell 18 through connecting vents 20. To minimize the migration of these aerosols from lower drywell 16 to upper drywell 18, a passive aerosol retention apparatus 30, illustrated in FIG. 2, is positioned in each connecting vent 20.

Figure 2:
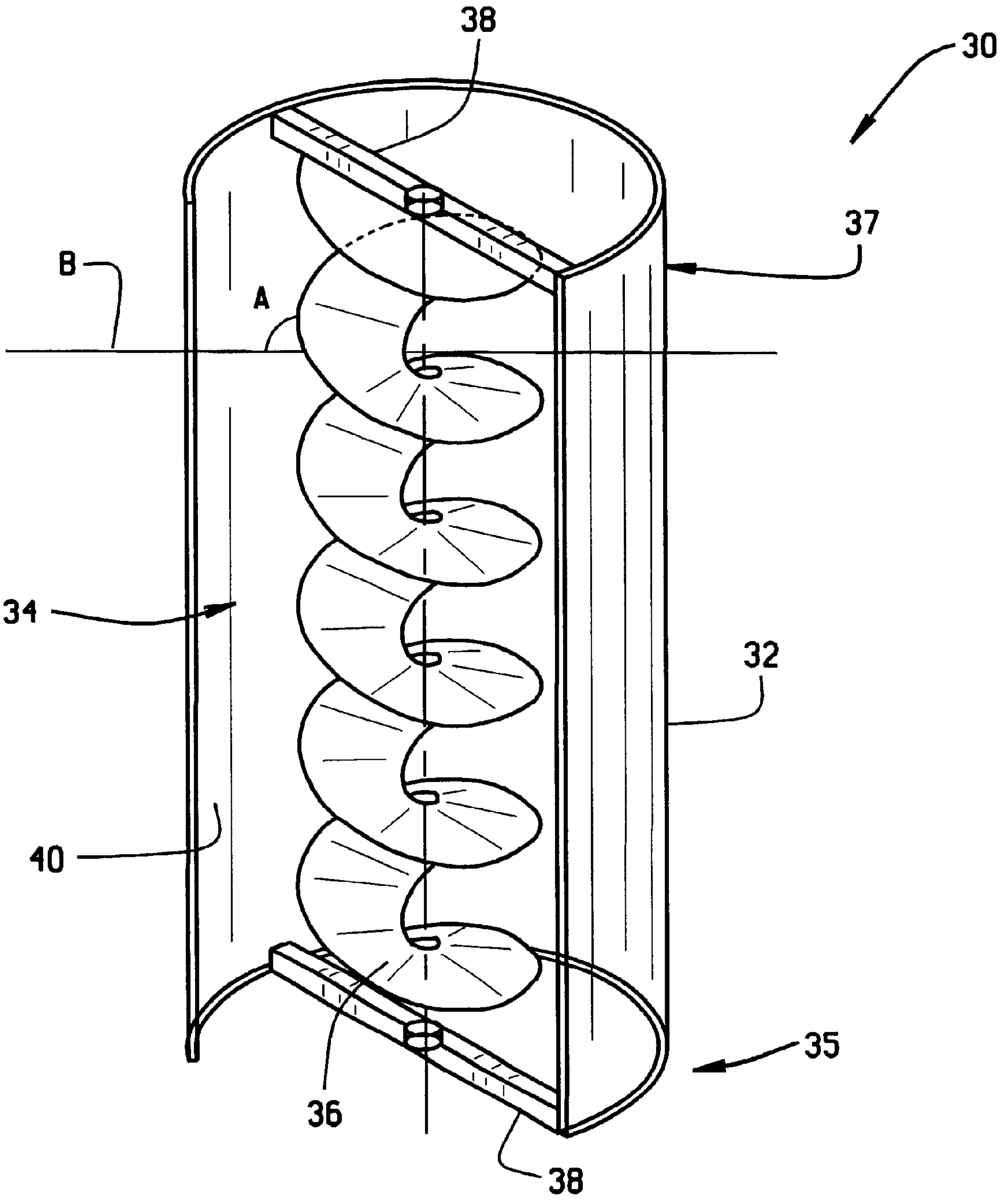
FIG. 2 is a perspective side view, with parts cut away, of a passive aerosol retention apparatus in accordance with an embodiment of the present invention.

Referring to FIG. 2, aerosol retention apparatus 30 includes a substantially cylindrical housing 32 and a flow modulator 34 positioned inside housing 32 and extending at least partially from a first end 35 to a second end 37 of housing 32. Flow modulator 34 includes a helically shaped baffle 36 positioned inside housing 32 so as to be coaxial with housing 32. Helical baffle 36 is coupled at each end to housing 32 by attachment bars 38. Particularly, helical baffle 36 is attached at each end to an attachment bar 38, usually by welding. Attachment bars 38 are coupled at each end to housing 32. Attachment bars 38 are coupled to housing 32 by welding, mechanical fasteners, or the like.

In one embodiment, the diameter of helical baffle 36 is less than the inside diameter of housing 32. Typically, an angle A, formed by the intersection of helical baffle 36 and a radial plane B extending perpendicular to a longitudinal plane passing through the longitudinal axis of housing 32, is about 30 to about 60 degrees. In an alternative embodiment, housing 32 is connecting vent outer wall 22.

Aerosol retention apparatus 30 is fabricated from any suitable material, for example, stainless steel and INCONEL Ni—Cr—Fe alloy. In one embodiment, aerosol retention apparatus 30 is fabricated from stainless steel.

In operation, aerosol retention apparatus 30 are positioned in connecting vents 20 that are located between lower and upper drywell 16 and 18. Helical baffle 36 of aerosol retention apparatus 30 imparts a rotational component to the steam, gas and aerosol mixture as the mixture flows from lower drywell 16 to upper drywell 18. The resulting tangential acceleration imparted to the aerosol particles causes the aerosol particles to be thrown against an inside surface 40 of housing 32 of apparatus 30. The insoluble aerosol particles then may adhere to inside surface 40 of housing 32 or drop back into lower drywell 18. The aerosol particles that impact housing 32, agglomerate and build-up on inside surface 40 of housing 32 and then are transported back into lower drywell 18 because only a thin layer of aerosol particles can be maintained on the vertical inside surface 40 of housing 32 due to gravity and the tendency of the agglomerated particles to be transported by sedimentation flows.

Figure 3:
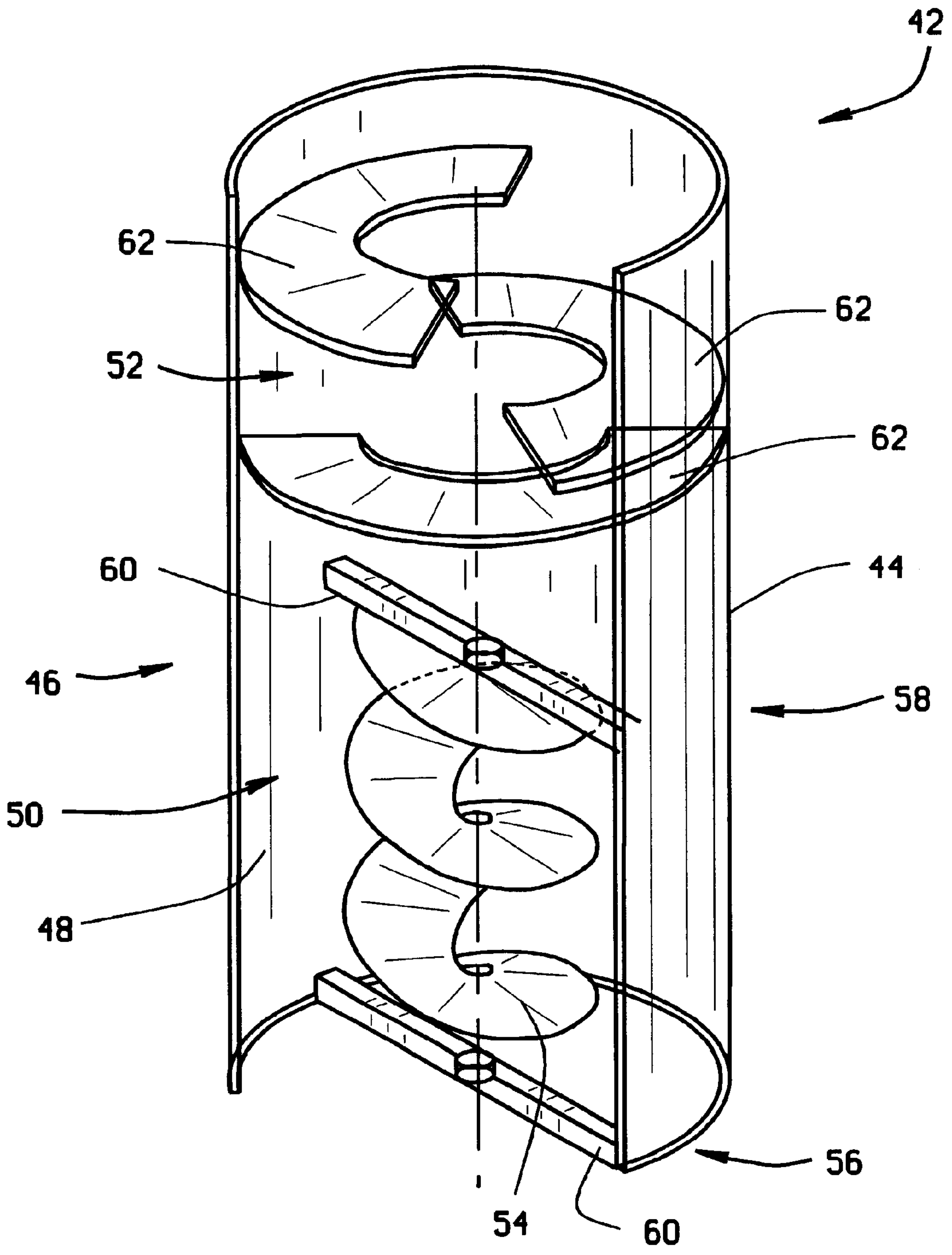
FIG. 3 is a perspective side view, with parts cut away, of a passive aerosol retention device in accordance with another embodiment of the present invention.

FIG. 3 is a perspective side view, with parts cut away, of an aerosol retention apparatus 42 in accordance with another embodiment of the present invention. Similar to aerosol retention apparatus 30 described above, apparatus 42 includes a substantially cylindrical housing 44 and a flow modulator 46 positioned inside housing 44. Cylindrical housing 44 includes an inside surface 48.

Flow modulator 46 includes a first section 50 and a second section 52. First section 50 of flow modulator 46 includes a helical shaped baffle 54 similar to helical baffle 36 described above. Helical baffle 54 is positioned inside housing 44 and extends from a first end 56 of housing 44 through a first portion 58 of housing 44. Helical baffle 54 is coupled at each end to housing 44 by attachment bars 60.

Second section 52 of flow modulator 46 includes a plurality of baffle plates 62 (three shown in FIG. 3) extending inwardly from inside surface 48 of housing 44. Baffle plates 62 are spaced axially and longitudinally from each other. Each baffle plate 62 is an arced segment ranging from about 90 to about 120 degrees as measured from the longitudinal axis. Each baffle plate 62 extends at a right angle from inside surface 48 of housing 44. Specifically, each baffle plate 62 extends from inside surface so as to be within a radial plane perpendicular to a longitudinal plane passing through the longitudinal axis of housing 44. In an alternative embodiment, housing 44 is connecting vent outer wall 22.

Figure 4:
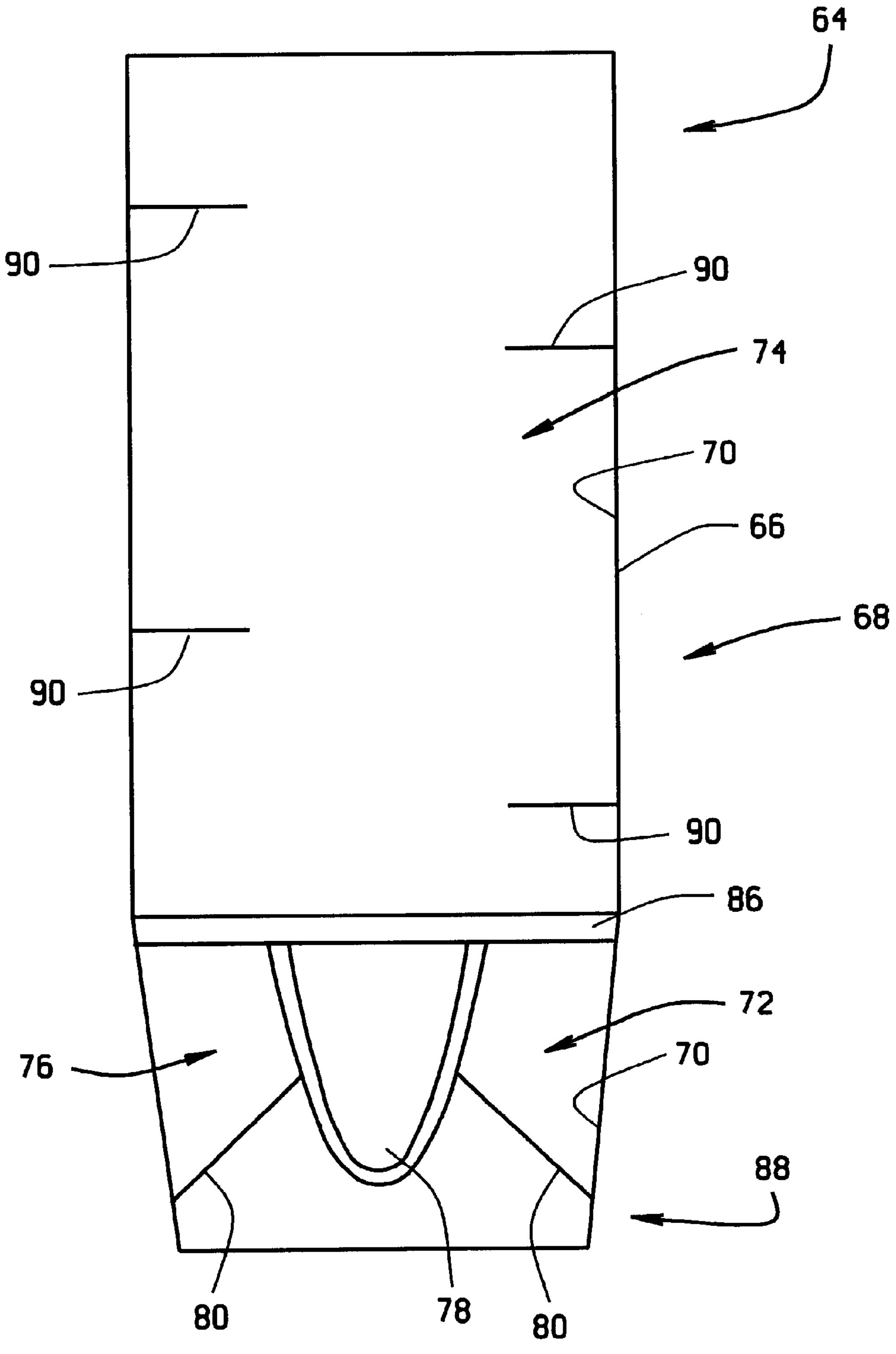
FIG. 4 is a side view, with parts cut away, of a passive aerosol retention device in accordance with still another embodiment of the present invention.

FIG. 4 is a side schematic view, with parts cut away, of a passive aerosol retention device 64 in accordance with still another embodiment of the present invention. Similar to aerosol retention apparatus 42 described above, apparatus 64 includes a substantially cylindrical housing 66 and a flow modulator 68 positioned inside housing 66. Cylindrical housing 66 includes an inside surface 70.

Figure 5:
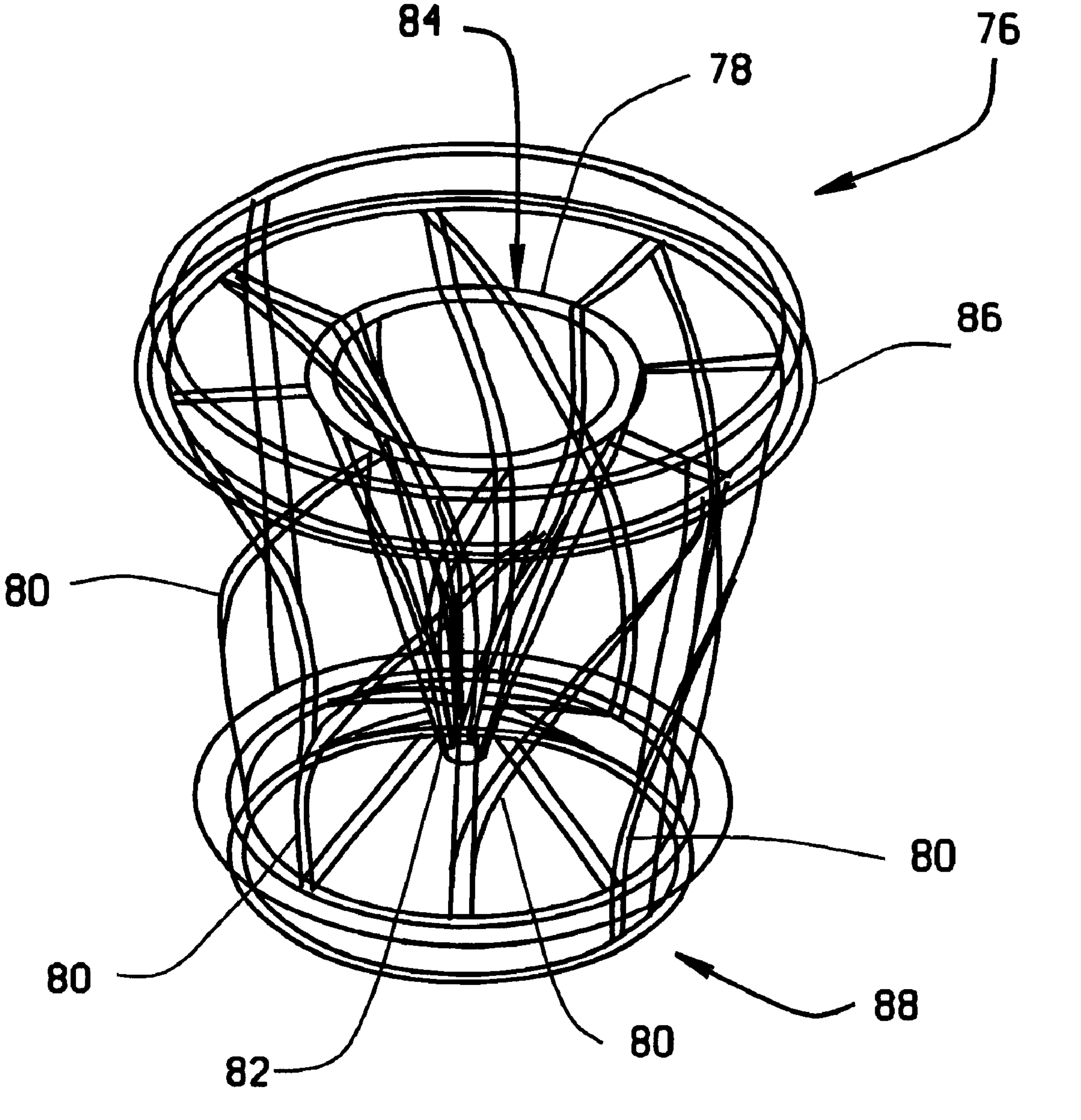
FIG. 5 is a perspective view of the inlet swirler portion of the passive aerosol retention device shown in FIG. 4.

Flow modulator 68 includes a first section 72 and a second section 74. First section 72 of flow modulator 68 includes an inlet swirler 76. FIG. 5 shows a perspective view of inlet swirler 76. Referring to FIGS. 4 and 5, inlet swirler 76 includes a central conical shaped portion 78 and a plurality of curved vanes 80 extending from central conical portion 78. Each vane 80 extends longitudinally from a first end 82 to a second end 84 of conical portion 78. Second end 84 of conical portion 78 is adjacent to second portion 74 of flow modulator 68. Also, each vane 80 extends radially from central conical portion 78 to inside surface 70 of housing 66. Curved vanes 80 impart a spin to the steam, gas, and aerosol mixture, as the mixture flows from the lower drywell to the upper drywell, causing the aerosol particles to be separated from the mixture.

Inlet swirler 76 is coupled to housing 66 by attachment collar 86 and vanes 80. Particularly, central conical portion 78 is coupled to attachment collar 86 by vanes 80 and collar 86 is attached to housing 66. Also, vanes 80 are coupled to housing 66. Housing 66 is configured so that the diameter at a first end 88 is less than the diameter of housing 66 at second section 74 of flow modulator 68.

Similar to flow modulator 46, described above, second section 74 of flow modulator 68 includes a plurality of baffle plates 90 (four shown in FIG. 4) extending inwardly from inside surface 70 of housing 66. Baffle plates 90 are spaced axially and longitudinally from each other. Each baffle plate 90 is an arced segment ranging from about 90 to about 120 degrees as measured from the longitudinal axis. Each baffle plate 90 extends at a right angle from inside surface 70 of housing 66. Specifically, each baffle plate 90 extends from inside surface so as to be within a radial plane perpendicular to a longitudinal plane passing through the longitudinal axis of housing 66. In an alternative embodiment, housing 66 is connecting vent outer wall 22.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An aerosol retention apparatus for capturing aerosols passing through a vent, said retention apparatus comprising:

a housing comprising a first end and a second end, said housing comprising a substantially cylindrical shape;

at least one attachment bar disposed inside said housing, said at least one attachment bar comprising a first end and a second end, said first and said second end of said at least one attachment bar coupled to said housing; and a flow modulator positioned inside said housing and mounted to said at least one attachment bar, said modulator extending at least partially from said first end to said second end of said housing, said flow modulator comprising a helically shaped baffle having a diameter less then an inside diameter of said housing.

2. An aerosol retention apparatus in accordance with claim 1 wherein an angle formed by the intersection of said helical baffle and a radial plane is about 30 to about 60 degrees, said radial plane perpendicular to a longitudinal plane passing through the longitudinal axis of said housing.

3. An aerosol retention apparatus in accordance with claim 1 further comprising a plurality of baffle plates extending inwardly from an inside surface of said housing, said baffle plates spaced axially and longitudinally from each other.

4. An aerosol retention apparatus in accordance with claim 3 wherein said baffle plates are arced segments, said segments ranging from about 90 to about 120 degrees as measured from the longitudinal axis.

5. An aerosol retention apparatus in accordance with claim 4 wherein each said baffle plates extends from said inside surface of said housing so as to be within a radial plane perpendicular to a longitudinal plane passing through the longitudinal axis of said housing.

6. An aerosol retention apparatus in accordance with claim 3 wherein said helical baffle is located in a first portion of said cylindrical housing, and said plurality of baffle plates are located in a second portion of said housing, said first housing portion extending from said first end of said housing to said second portion, said second housing portion extending from said second end of said housing to said first portion.

7. An aerosol retention apparatus in accordance with claim 6 wherein said helical baffle is replaced by an inlet swirler comprising a central conical shaped section and a plurality of baffles extending from said central conical shaped section.

8. An aerosol retention apparatus in accordance with claim 7 wherein the diameter of said first end of said housing is less than the diameter of said second portion of said housing.

9. A nuclear reactor comprising:

a reactor pressure vessel;

an upper and a lower drywell separated by a reactor pressure vessel support;

a plurality of connecting vents extending through and located circumferentially around said reactor pressure vessel support, said connecting vents providing flow communication between said upper and lower drywells; and a plurality of passive aerosol retention apparatus positioned in said connecting vents, each said aerosol retention device positioned in a separate connecting vent, and each said aerosol retention device comprising:

a housing comprising a first end and a second end; and a flow modulator positioned inside said housing and extending at least partially from said first end to said second end of said housing, said flow modulator comprising a helically shaped baffle.

10. A nuclear reactor in accordance with claim 9 wherein said aerosol retention apparatus housing comprises said connecting vent sidewall.

11. A nuclear reactor in accordance with claim 9 wherein an angle formed by the intersection of said helical baffle and a radial plane is about 30 to about 60 degrees, said radial plane perpendicular to a longitudinal plane passing through the longitudinal axis of said housing.

12. A nuclear reactor in accordance with claim 9 wherein said housing comprises a substantially cylindrical shape, and the diameter of said helical baffle is less than the inside diameter of said housing.

13. A nuclear reactor in accordance with claim 12 wherein said aerosol retention apparatus further comprises a plurality of baffle plates extending inwardly from said inside surface of said housing, said baffle plates spaced axially and longitudinally from each other.

14. A nuclear reactor in accordance with claim 13 wherein said baffle plates are arced segments, said segments ranging from about 90 to about 120 degrees as measured from the longitudinal axis.

15. A nuclear reactor in accordance with claim 14 wherein each said baffle plates extends from said inside surface of said housing so as to be within a radial plane perpendicular to a longitudinal plane passing through the longitudinal axis of said housing.

16. A nuclear reactor in accordance with claim 13 wherein said helical baffle is located in a first portion of said cylindrical housing, and said plurality of baffle plates are located in a second portion of said housing, said first housing portion extending from said first end of said housing to said second portion, said second housing portion extending from said second end of said housing to said first portion.

17. A nuclear reactor in accordance with claim 16 wherein said helical baffle is replaced by an inlet swirler comprising a central conical shaped section and a plurality of baffles extending from said central conical shaped section.

18. A nuclear reactor in accordance with claim 17 wherein the diameter of said first end of said housing is less than the diameter of said second portion of said housing.

* * * * *